United States Patent

Christiansen

[15] 3,667,153

[45] June 6, 1972

[54] INTERLOCKING ARRANGEMENTS
[72] Inventor: Godtfred Kirk Christiansen, Billund, Denmark
[73] Assignee: Interlego A.G., Zug, Switzerland
[22] Filed: June 29, 1970
[21] Appl. No.: 50,384

[30] Foreign Application Priority Data

July 3, 1969 Denmark..............................3611/69

[52] U.S. Cl.................................................................46/30
[51] Int. Cl........................................................A63l 33/06
[58] Field of Search...............................46/30; 287/20.92 T

[56] References Cited

UNITED STATES PATENTS 357,144  2/1887  Buttler............................287/20.92 T
757,812  4/1904  Keyes..............................287/20.92 T

FOREIGN PATENTS OR APPLICATIONS 564,917  1958  Belgium.................................52/590

Primary Examiner—Louis G. Mancene
Assistant Examiner—T. Q. Lever
Attorney—Stevens, Davis, Miller & Mosher

[57] ABSTRACT

The coupling of two plate-shaped elements be means of an interlocking arrangement formed along the edges of the elements. The locking members of one element are in resilient engagement with identical locking members on the other element, the thickness of the individual locking members being half the thickness of the element and the members being staggered alternately to one side and the other of a plane through the center of the edge parallel to the side faces of the element.

2 Claims, 2 Drawing Figures

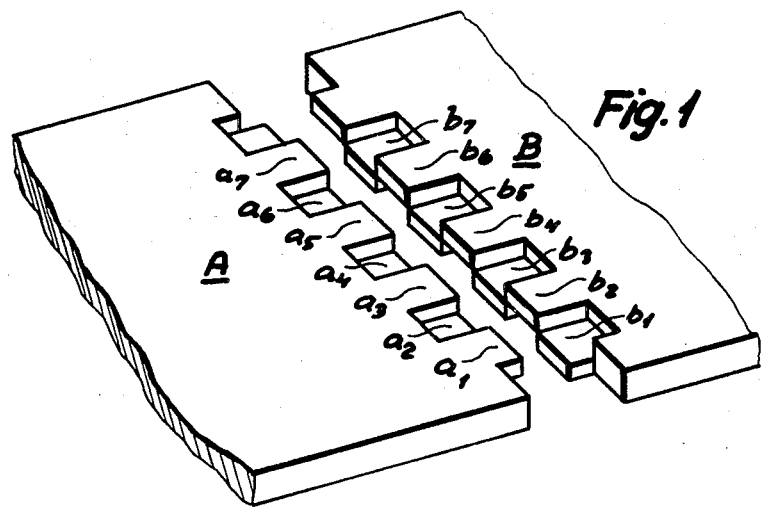
Fig. 1
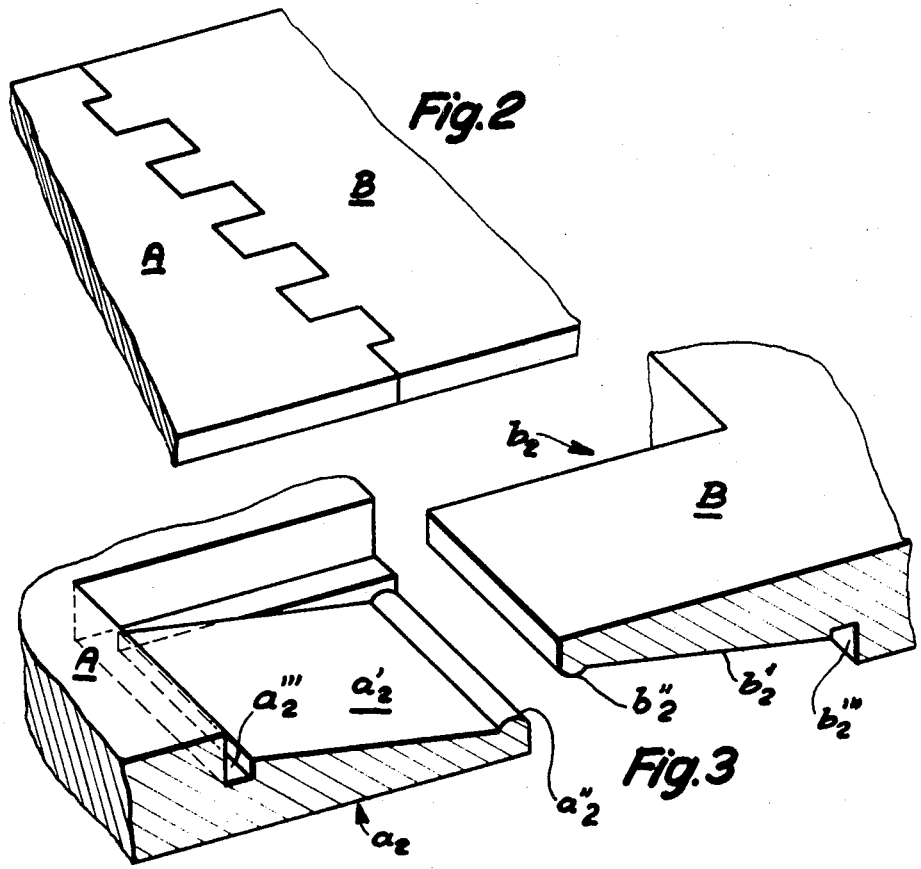
Fig. 2
Fig. 3

INTERLOCKING ARRANGEMENTS

This invention relates to an interlocking arrangement for coupling two plate-shaped elements together along an edge thereof.

It is known to couple two plate-shaped elements together along an edge thereof by means of locking members such as a tongue on one element and a groove in the other element. This is used for instance in the building industry when putting down floors. Also other forms of coupling may be used for joining plate-shaped elements for various purposes. These known couplings are not in themselves particularly sturdy and the elements may easily work loose if no extra binding material such as glue or nails is used. It is also a drawback that the locking members are not identical on the two elements to be coupled together but consist of for instance a tongue on one and a groove in the other element, so that the members must be placed in a certain relationship before being coupled.

It is the aim of the present invention to provide an interlocking arrangement for coupling two plate-shaped elements together along an edge thereof, in which the said drawbacks have been obviated and which is particularly, though not exclusively, suitable for use in connection with plate elements of toy building sets.

The interlocking arrangement according to the invention is characteristic in that it comprises a plurality of locking members formed along the edge of each element, staggered alternately to one and the other side with respect to a common plane extending between and parallel to the side faces of the element and distributed along the edge so that the surface of each locking member facing the common plane on being coupled will abut the corresponding surface of a locking member of the other element and form resilient engagement therewith.

By means of a locking arrangement like this the elements can be coupled and released readily and repeatedly without affecting the efficiency of the members because the locking members of one element are in resilient engagement with the corresponding locking members of the other element, and when the elements are to be released the friction resulting chiefly from this resilient engagement must be overcome. The friction thus prevents undesirable slackening of the coupling. Moreover, the locking members are formed to be exactly alike on the two elements, which therefore need not be turned a certain way relatively to each other as in a tongue-groove coupling.

In a very practical and expedient embodiment of the invention the locking members are identical and in the direction parallel to the side faces of the elements of rectangular or square configuration and are disposed without intervening space along the coupling edge. In this manner the coupling edge is utilized in its entire length and a very effective coupling provided.

In another embodiment the surfaces of the locking members facing the common plane are provided with a supplementary locking arrangement, whereby an improved locking effect between the elements has been achieved.

In a preferred embodiment of the invention the supplementary locking arrangement is formed by a section of the surface facing the common plane which has been inclined slightly with respect to the plane so as to increase the thickness of the locking member towards the element and form a raised portion and a recessed portion parallel to the edge for engagement with corresponding recessed and raised portions of the element with which it is to be coupled. Here, too, all the locking members of the interlocking arrangement are completely alike.

The invention will be explained in greater detail below with reference to the drawing, in which FIG. 1 presents a perspective view of two plate-shaped elements provided with an interlocking arrangement according to the invention, FIG. 2 is a perspective view of the same elements after being coupled, and FIG. 3 shows in perspective an interlocking arrangement with a locking member on each of the two plate-shaped elements on an enlarged scale.

FIG. 1 shows a plate-shaped element A and a second plate-shaped element B. Each of the two elements is provided with one-half of an interlocking arrangement, 1A and 1B respectively, for being coupled together along one edge thereof. The interlocking arrangement comprises a plurality of locking members formed along the edge, on the element A designated $a_1, a_2, a_3, a_4, a_5 \ldots$ and on the element B designated $b_1, b_2, b_3, b_4, b_5 \ldots$. Of the locking members of element A $a_1, a_3, a_5 \ldots$ are staggered to one side and members $a_2, a_4, a_6 \ldots$ to the other side relatively to a common plane which is parallel to the side faces of the element and preferably, though not necessarily, spaced equally from the two side faces of the element. The locking members of the element B: $b_2, b_4, b_6$ and $b_1, b_3, b_5 \ldots$ are staggered in the same way, and when the elements A and B have been coupled together as shown in FIG. 2, the surface of locking member $a_1$ facing the common plane will resiliently abut the corresponding surface of the locking member $b_1$, and all the following locking members will be similarly engaged: $a_2-b_2, a_3-b_3, a_4-b_4 \ldots$. The locking members are preferably, as shown in the drawing, identical in shape and in the direction parallel to the side faces of the elements of rectangular configuration. They are also preferably disposed without intervening space along the entire coupling edge, which is thereby utilized in its full extension.

On the surface facing the common plane the individual locking members may with great advantage be provided with additional locking arrangements, as illustrated in FIG. 3. This figure shows a single pair of locking members, for instance $a_2-b_2$ of elements A and B. A section, $a_2'$ and $b_2'$ respectively, of the surface facing the common plane is inclined slightly with respect to the plane so that the thickness of the locking member increases towards the corresponding element so as to form a raised portion $a_2''$ and a recessed portion $a_2'''$ in the locking member $a_2$ and a raised portion $b_2''$ and a recessed portion $b_2'''$ in the locking member $b_2$. When the elements A and B are coupled together the surface section $a_2'$ will slide on surface section $b_2'$, whereby the locking members will yield slightly until the raised portion $a_2''$ engages the recessed portion $b_2'''$ and the raised portion $b_2''$ engages the recessed portion $a_2'''$. The locking of the members provided in this manner will require a greater initial force to release when the members are to be separated.

What I claim is:

1. An interlocking arrangement for coupling two plate-shaped elements together along one edge thereof, said arrangement comprising a plurality of substantially identical locking members disposed along one edge of each element extending an equal distance from said edge and staggered alternately to one side and the other with respect to a common plane located between and extending parallel to the side faces of the element, the arrangement of said locking members being such that, in a pair of assembled plate elements, the surface of each locking member of one element facing the common plane will resiliently abut and be frictionally held against a corresponding surface of a locking member of the other element.

2. An interlocking arrangement as claimed in claim 1, in which the surface of each locking member facing the said common plane is slightly inclined relatively thereto, so as to gradually increase the thickness of the locking members towards the element, and is provided with a bead at one end and a groove at the other end of said surface.

* * * * *